United States Patent
Seo et al.

(10) Patent No.: US 12,103,358 B2
(45) Date of Patent: Oct. 1, 2024

(54) VEHICLE AIR CONDITIONER

(71) Applicant: Hanon Systems, Daejeon (KR)

(72) Inventors: Yong Eun Seo, Daejeon (KR); Tae Wan Kim, Daejeon (KR); Sang Chul Byon, Daejeon (KR); Jong Gon Lee, Daejeon (KR); Tae Gun Lee, Daejeon (KR); Sang Il Hwang, Daejeon (KR); Sae Dong Eom, Daejeon (KR)

(73) Assignee: Hanon Systems, Daejeon (KR)

( * ) Notice: Subject to any disclaimer, the term of this patent is extended or adjusted under 35 U.S.C. 154(b) by 194 days.

(21) Appl. No.: 17/796,868

(22) PCT Filed: Feb. 17, 2021

(86) PCT No.: PCT/KR2021/001990
§ 371 (c)(1),
(2) Date: Aug. 1, 2022

(87) PCT Pub. No.: WO2021/167329
PCT Pub. Date: Aug. 26, 2021

(65) Prior Publication Data
US 2023/0054052 A1 Feb. 23, 2023

(30) Foreign Application Priority Data
Feb. 19, 2020 (KR) .......................... 10-2020-0020220

(51) Int. Cl.
*B60H 1/00* (2006.01)

(52) U.S. Cl.
CPC ..... *B60H 1/00842* (2013.01); *B60H 1/00064* (2013.01); *B60H 1/00685* (2013.01);
(Continued)

(58) Field of Classification Search
CPC ............ B60H 1/00824; B60H 1/00064; B60H 1/00685; B60H 2001/00092; B60H 2001/002
See application file for complete search history.

(56) References Cited

U.S. PATENT DOCUMENTS 6,311,763 B1 * 11/2001 Uemura ................. B60H 1/247
62/244
2006/0175050 A1 8/2006 Kang et al.
(Continued)

FOREIGN PATENT DOCUMENTS

| JP | 2001010327 A | 1/2001 |
| JP | 2003104039 A | 4/2003 |
(Continued)

OTHER PUBLICATIONS

Written Opinion of the International Searching Authority and International Search Report for International Application No. PCT/KR2021/001990 mailed Jun. 8, 2021, 9 page(s), English Translation of International Search Report Included.

*Primary Examiner* — Marc E Norman
(74) *Attorney, Agent, or Firm* — Dickinson Wright PLLC

(57) ABSTRACT

A vehicle air conditioner for supplementing and regulating the air volume discharged to front seats and rear seats through a door component that controls a passage, and enabling the length of a package in the direction of a heater core to be reduced. The vehicle air conditioner has an air passage comprising: a front seat air passage through which cold air or hot air is discharged toward the front seats of a vehicle; and a rear seat air passage through which cold air or hot air is discharged toward the rear seats of the vehicle, wherein the front seat air passage comprises a front seat cooling passage and a front seat heating passage, and the rear seat path comprises a rear seat cooling passage and a rear seat heating passage, and includes: a first mixing part in (Continued)

which the cold air of the front seat cooling passage and the hot air of the front seat heating passage are mixed; and a second mixing part in which the cold air of the rear seat cooling path and the hot air of the rear seat heating path are mixed.

10 Claims, 8 Drawing Sheets

(52) U.S. Cl.
CPC .............. *B60H 2001/00092* (2013.01); *B60H 2001/002* (2013.01)

(56) References Cited

U.S. PATENT DOCUMENTS

| | | | |
|---|---|---|---|
| 2018/0326812 A1* | 11/2018 | Ko | B60H 1/00685 |
| 2019/0366796 A1* | 12/2019 | Omori | B60H 1/00 |
| 2019/0375272 A1* | 12/2019 | Kim | B60H 1/12 |
| 2022/0153083 A1* | 5/2022 | Kim | B60H 1/00064 |

FOREIGN PATENT DOCUMENTS

| | | | |
|---|---|---|---|
| JP | 2005170090 A | 6/2005 |
| KR | 20110021074 A | 3/2011 |
| KR | 101578100 B1 | 12/2015 |
| KR | 20170086725 A | 7/2017 |
| KR | 20180001612 A | 1/2018 |

\* cited by examiner

PRIOR ART

PRIOR ART

VEHICLE AIR CONDITIONER

CROSS-REFERENCE TO RELATED APPLICATIONS

This application is a U.S. National Stage of International Patent Application Serial No. PCT/KR2021/001990, filed Feb. 17, 2021, which claims the benefit of Korean Patent Application Serial No. 10-2020-0020220, filed Feb. 19, 2020. The entire disclosures of each of the above applications are incorporated herein by reference.

TECHNICAL FIELD

The present invention relates to an air conditioner for a vehicle and, more specifically, to an air conditioner for a vehicle capable of increasing air volume and improving a blowing function by improving an air passage inside the air conditioner for a vehicle.

BACKGROUND ART

In general, an air conditioner for a vehicle corresponds to an interior of a vehicle which is installed to allow a driver to secure a front and a rear view by removing frost on a windshield or a winter season or frost on a winter season or winter season. Since the air conditioner typically has a heating system and a cooling system at the same time, the air conditioner selectively introduces external air or air to heat or cool the air, and then blows the air to the inside of the vehicle, thereby cooling and heating or ventilating the interior of the vehicle.

Korean Patent Laid-open No. 2015-0088577 (published on Aug. 3, 2015) discloses an air conditioner for a vehicle which adjusts the air volume of a rear seat by controlling locations of a rear seat temperature door, an auxiliary rear seat temperature door, and a rear seat on-off door.

FIG. 1 is a sectional view illustrating a conventional air conditioner for a vehicle. As illustrated in FIG. 1, the conventional air conditioner for a vehicle includes an air conditioning case 10, an evaporator 20, a heater core 30, a front seat temperature door 51, and a front seat mode door. The air conditioning case 10 includes an air inlet 11, air outlets 12, 13, 14, 15 and 16, and an air passage formed therein. An air blower is connected to the air inlet 11, so that indoor air or outdoor air is selectively induced into the air passage of the air conditioning case 10. The air outlets are a defrost vent 12, a front seat face vent 13, a floor vent 114, a rear seat face vent 15, and a rear seat floor vent 16. The air passage in the air conditioning case 10 includes a front seat cold air passage P1, a hot air passage P2, and a rear seat cold air passage P3.

The evaporator 20 is a cooling heat exchanger to cool air passing through the evaporator 20. The heater core 30 is a heating heat exchanger to heat air passing through the evaporator 20. The heater core 30 is arranged at the hot air passage P2 which is located at a downstream side of the evaporator 20 in an air flow direction. The front seat temperature door 51 is arranged between the evaporator 20 and the heater core 30 in order to adjust an opening degree of the hot air passage P2 passing through the heater core 30 and opening degrees of the cold air passage P1 bypassing the heater core 30. The front seat mode door is composed of a defrost door 53, a vent door 54, and a floor door 55.

A rear seat air passage is composed of the rear seat cold air passage P3 that the air passing the evaporator 20 bypasses the heater core 30, and the hot air passage that the air passes the heater core 30. The hot air passage of the rear seat air passage is the hot air passage P2 of a front seat air passage. That is, some of the air flowing in the hot air passage P2 after passing the heater core 30 moves up, and then, is discharged to at least one among the defrost vent 12, the front seat face vent 13, and the floor vent 14. The rest of the air moves down, and then, through the rear seat air passage, is discharged to at least one among the rear seat face vent 15 and the rear seat floor vent 16. A rear seat mode door 58 which adjusts an opening degree of the rear seat face vent 15 and an opening degree of the rear seat floor vent 16 is disposed in the rear seat air passage.

In the air conditioning case 10, a rear seat temperature door 52, an auxiliary rear seat temperature door 56, and a rear seat on-off door 57 are disposed. The rear seat temperature door 52 is disposed between the evaporator 20 and the heater core 30 in order to adjust an opening degree of a passage connected to the hot air passage P2 and a passage connected to the rear seat cold air passage P3, and the auxiliary rear seat temperature door 56 is arranged at the downstream side of the heater core 30 in the air flow direction in order to adjust an opening degree of a passage connected to a rear seat air outlet. The rear seat on-off door 57 adjusts an opening degree of the rear seat cold air passage P3.

The conventional air conditioner for a vehicle does not use the lower end of the air conditioning case corresponding to the rear seat air passage when the rear seat is in an OFF-state. Therefore, there is a problem in that the overall performance is degraded compared to a case in which the rear seat is in an ON-state.

As illustrated in FIG. 2, the conventional air conditioner for a vehicle includes a temperature control door 51a provided between the evaporator 20 and the heater core 30 to control temperature. The temperature control door 51a extends to the rear surface to block heat of the heater core 30 during cooling, thereby sealing the air conditioning case 10. Therefore, in this case, the conventional air conditioner has various problems related with increase of air volume, air blowing function, and the like, for instance, a heater passage for heating is required, the size of the air conditioner in the direction of the heater core 30 due to the shape of the temperature control door 51a for blocking heat of the heater core 30 is increased during cooling.

DISCLOSURE

Technical Problem

Accordingly, the present invention has been made in view of the above-mentioned problems occurring in the related art, and it is an object of the present invention to provide an air conditioner for a vehicle capable of supplementing and regulating air volume discharged to front seats and rear seats through door components for controlling an air passage, and reducing the length of a package in the direction of a heater core.

Technical Solution

To accomplish the above-mentioned objects, according to the present invention, there is provided an air conditioner for a vehicle including: an air conditioning case having an air inlet for introducing air, air outlets for discharging the introduced air to the interior of the vehicle, and an air passage formed therein; a cooling heat exchanger and a heating heat exchanger disposed in the air passage of the air conditioning case to exchange heat with the air passing through the heat exchangers, the cooling heat exchanger and the heating heat exchanger being arranged sequentially. The air passage includes: a front seat air passage through which cold air or hot air is discharged toward a front seat of a vehicle; and a rear seat air passage through which cold air or hot air is discharged toward the rear seats of the vehicle, wherein the front seat air passage includes a front seat cooling air passage and a front seat heating air passage, and the rear seat air passage includes a rear seat cooling air passage and a rear seat heating air passage. The air conditioner for a vehicle further includes: a first mixing part in which the cold air of the front seat cooling air passage and the hot air of the front seat heating air passage are mixed; and a second mixing part in which the cold air of the rear seat cooling air passage and the hot air of the rear seat heating air passage are mixed.

Moreover, the air conditioner for a vehicle further includes: a communication part disposed downstream of the first mixing part and the second mixing part so that the front seat air passage and the rear seat air passage communicate with each other; and an air volume distribution door disposed at the communication part to control the volume of air discharged to a front seat air outlet and a rear seat air outlet.

Furthermore, the air volume distribution door is formed in a dome type to control the air volume of the front seat air passage and the air volume of the rear seat air passage.

Additionally, the air volume distribution door is positioned to separate and partition the front seat air passage and the rear seat air passage.

In addition, the air volume distribution door is positioned to connect the front seat air passage and the rear seat air passage and to close the rear seat outlet.

Moreover, the air volume distribution door is positioned to connect the front seat air passage and the rear seat air passage and to close the front seat outlet while opening the rear seat outlet.

Furthermore, the air conditioner for a vehicle further includes a front seat temperature control door disposed at the upper end of the downstream side of the cooling heat exchanger to simultaneously adjust an opening degree of the front seat cooling air passage and an opening degree of the front seat heating air passage.

Additionally, the air conditioner for a vehicle further includes a rear seat temperature control door disposed at the upper end of the downstream side of the cooling heat exchanger to simultaneously adjust an opening degree of the rear seat cooling air passage and an opening degree of the rear seat heating air passage.

In addition, the front seat temperature control door has a shield formed in one direction around a driving shaft.

Moreover, the air conditioner for a vehicle further includes an auxiliary front seat temperature control door disposed at the upper end of the downstream side of the heating heat exchanger to adjust an opening degree of the front seat heating air passage.

Furthermore, the air conditioner for a vehicle further includes an auxiliary rear seat temperature control door disposed at the lower end of the downstream side of the heating heat exchanger to adjust an opening degree of the rear seat heating air passage.

Additionally, the air conditioner for a vehicle includes a dash panel for partitioning an engine room from the interior of the vehicle, the plurality of heat exchangers are arranged in the engine room, and the plurality of air discharge vents are arranged in the interior of the vehicle.

In addition, the first mixing part and the second mixing part respectively have bottleneck portions of which the air passages are narrowed, and the bottleneck portions are respectively formed at penetration parts of the dash panel.

Effect of Invention

The air conditioner for a vehicle according to the present invention can supplement and regulate the air volume discharged to fronts seat and rear seats through the door components for controlling the front seat and the rear seat, thereby improving performance of the air conditioner.

In addition, the air conditioner for a vehicle according to the present invention can reduce the length of the package in the direction of the heater core, thereby reducing the size of the air conditioner.

MODE FOR INVENTION

Hereinafter, a technical configuration of an air conditioner for a vehicle according to the present invention will be described in detail.

Figure 1:
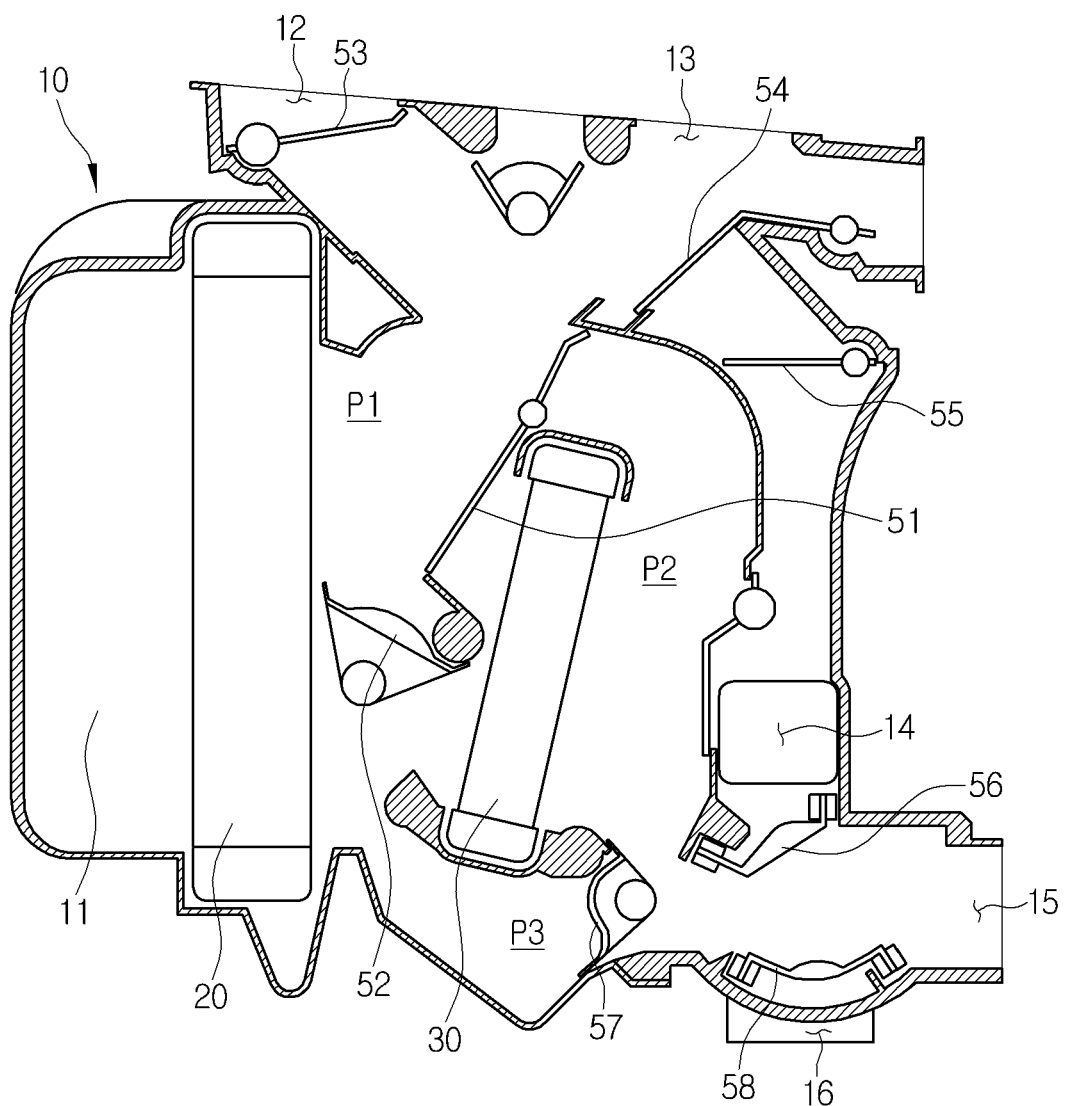
FIG. 1 is a cross-sectional view of a conventional air conditioner for a vehicle.
Figure 2:
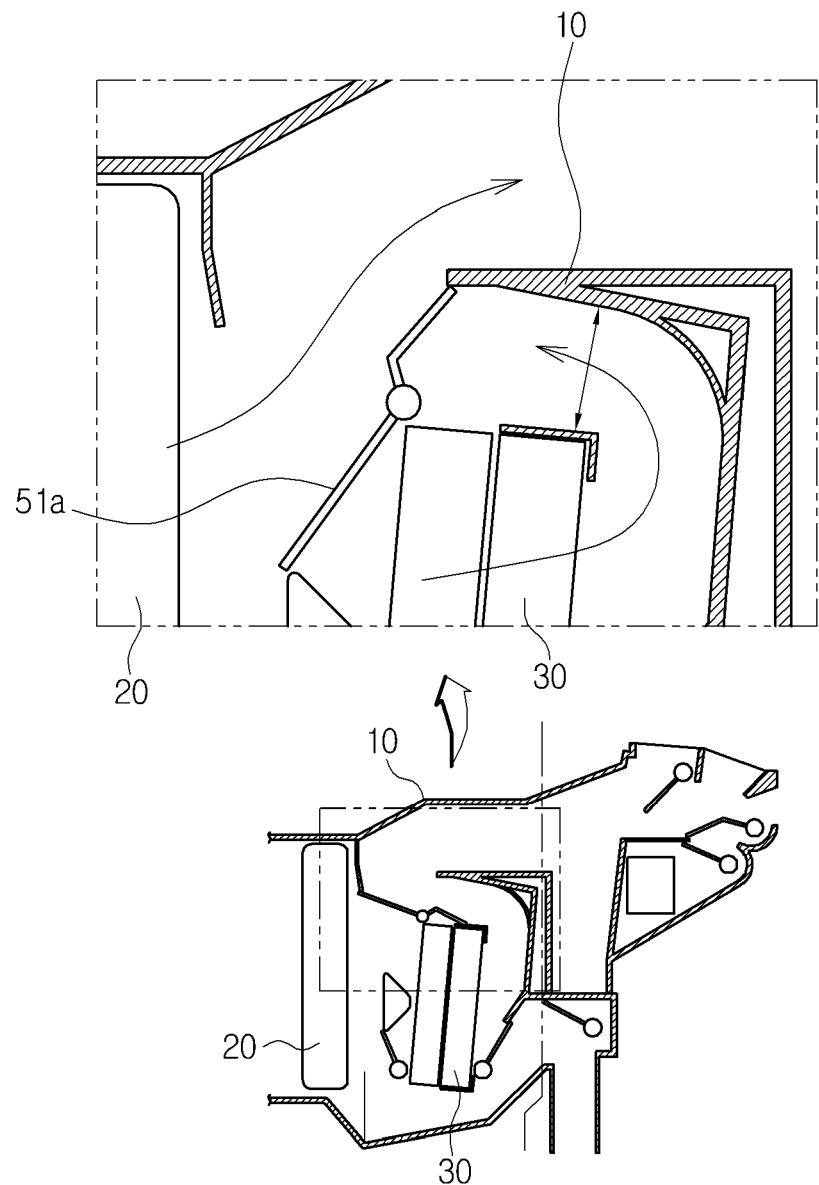
FIG. 2 is a cross-sectional view illustrating a temperature control door and an air passage between an evaporator and a heater core of the conventional air conditioner for a vehicle.
Figure 3:
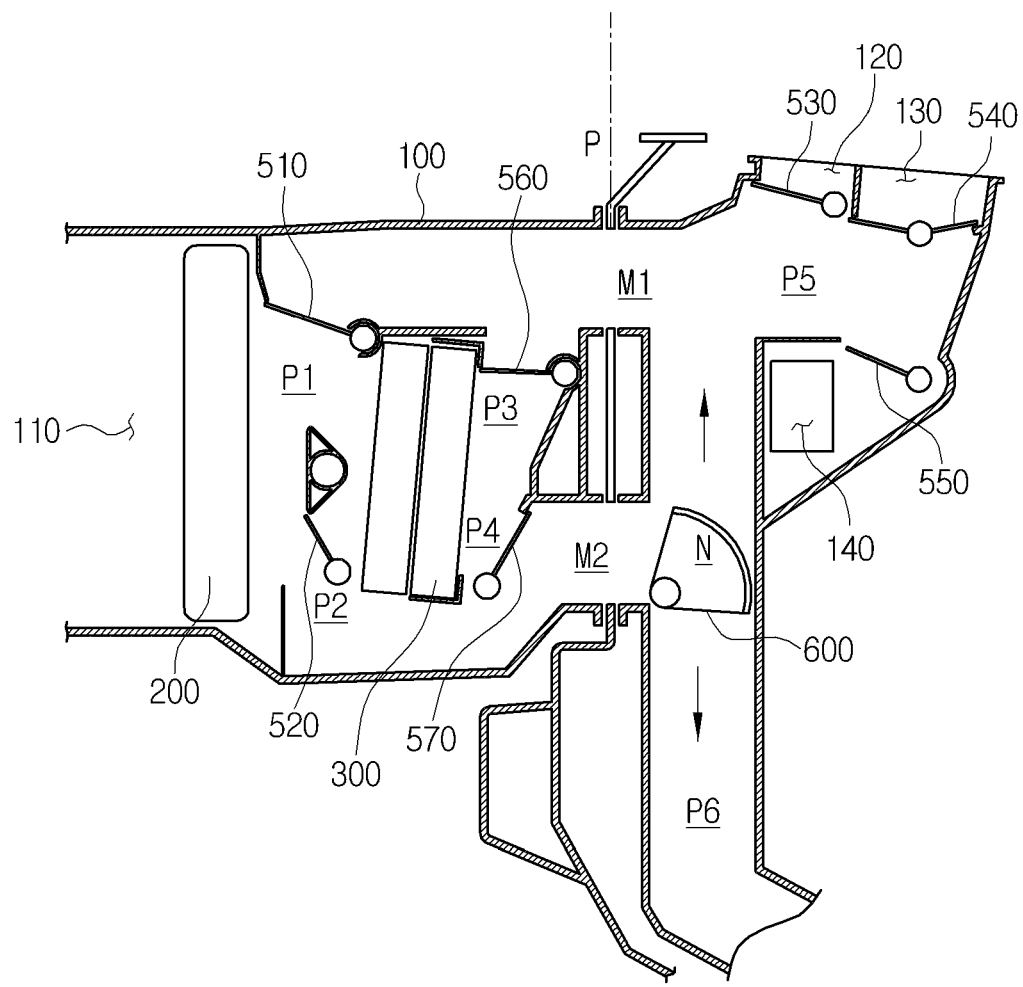
FIG. 3 is a cross-sectional view illustrating an air conditioner for a vehicle according to an embodiment of the present invention.

FIG. 3 is a cross-sectional view illustrating an air conditioner for a vehicle according to an embodiment of the present invention.

As illustrated in FIG. 3, the air conditioner for a vehicle according to an embodiment of the present invention includes: an air conditioning case 100 having an air passage formed therein; and a cooling heat exchanger 200 and a heating heat exchanger 300 provided in the air passage of the air conditioning case 100 to exchange heat with air passing therethrough. The cooling heat exchanger 200 and the heating heat exchanger 300 may be arranged sequentially.

The cooling heat exchanger 200 may be an evaporator. refrigerant flowing in the evaporator and the air passing through the evaporator exchange heat each other to cool the air. The heating heat exchanger 300 may be a heater core. Cooling water flowing in the heater core and the air passing through the heater core exchange heat each other to heat the air. The heater core is disposed in front and rear seat heating passages P3 and P4, which are downstream sides of the evaporator in an air flow direction.

The air conditioning case 100 includes an air inlet 110 and air outlets P5 and P6, and an air passage is formed in the air conditioning case 100. An air blower is connected to the air inlet 110 so that indoor air or outdoor air is selectively introduced into the air passage of the air conditioning case 100.

The air outlets P5 and P6 are composed of a front seat air outlet P5 connected to a defrost vent 120, a front seat face vent 130, and a front seat floor vent 140, and a rear seat air outlet P6 connected to a rear seat face vent (not shown) and a rear seat floor vent (not shown). The air passage inside the air conditioning case 100 includes cooling air passages P1 and P2 and heating air passages P3 and P4. The cooling air passages P1 and P2 are divided into a front seat cooling air passage P1 and a rear seat cooling air passage P2, and the heating air passages P3 and P4 are also divided into a front seat heating air passage P3 and a rear seat heating air passage P4.

At the upper end of the downstream side of the air passage, disposed are a first mixing part Ml in which cold air and hot air flowing into the front and rear seat air passages P1 and P3 are mixed, and a front seat outlet P5 for guiding the mixed air to be discharged toward the front seat of the vehicle. Furthermore, at the lower end of the downstream side, disposed are a second mixing part M2 in which cold air and hot air flowing into the rear seat air passages P2 and P4 are mixed, and an outlet P6 for guiding the mixed air to be discharged to the rear seat of the vehicle.

A communication part N for communicating the rear seat air passages P2 and P4 with the front seat air passages P1 and P3 is formed downstream of the first mixing part Ml and the second mixing part M2. The communication part N includes an air volume distribution door 600 capable of simultaneously controlling the air volume discharged to the front seat air outlet P5 and the air volume discharged to the rear seat air outlet P6. Preferably, the air volume distribution door 600 can be formed in a dome type so as to control the air volume of the front seat and the rear seat more easily.

The plurality of vents connected to the front seat air outlet P5 of the air conditioning case 100 are controlled in their opening degrees by a front seat mode door. The front seat mode door includes a defrost door 530 for adjusting an opening degree of the defrost vent 120, a vent door 540 for adjusting an opening degree of the front seat face vent 130, and a floor door 550 for adjusting an opening degree of the front seat floor vent 140. In addition, a plurality of vents interworking with the rear seat air outlet are also controlled by the rear seat mode door.

As described above, the air volume distribution door 600 is mounted upstream of the plurality of vents in which air is discharged into the interior of the vehicle, so as to primarily control the air volume of the front seat and the rear seat. The air volume distribution door 600 is positioned around the communication part N to separate and partition the front seat air passages P1 and P3 and the rear seat air passages P2 and P4. Hereinafter, referring to the attached drawings, the flow of air flowing through the front and rear seat air passages according to the operation states of the air conditioner for a vehicle according to the present invention will be described in detail.

Figure 4:
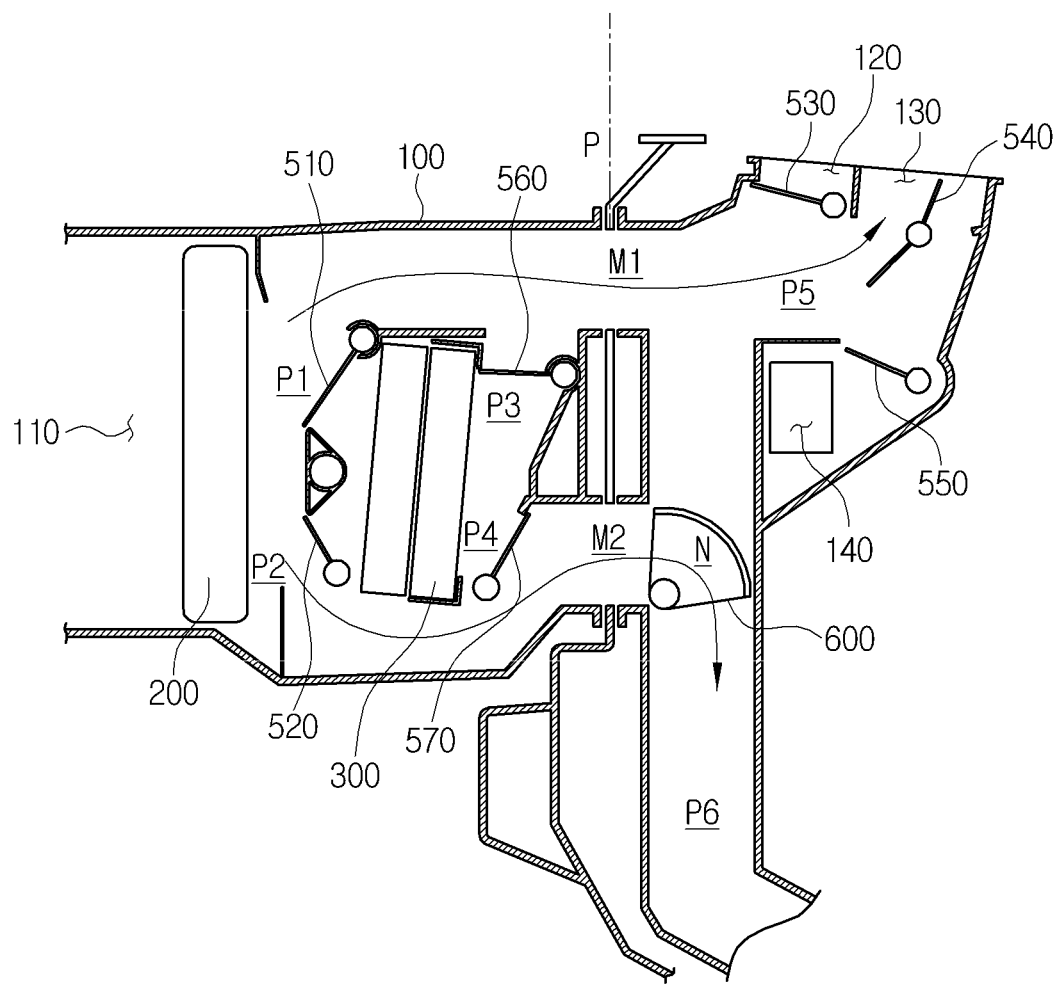
FIG. 4 is a cross-sectional view illustrating a state in which a front seat air passage and a rear seat air passage of the air conditioner for a vehicle according to an embodiment of the present invention are in an ON-state.
Figure 5:
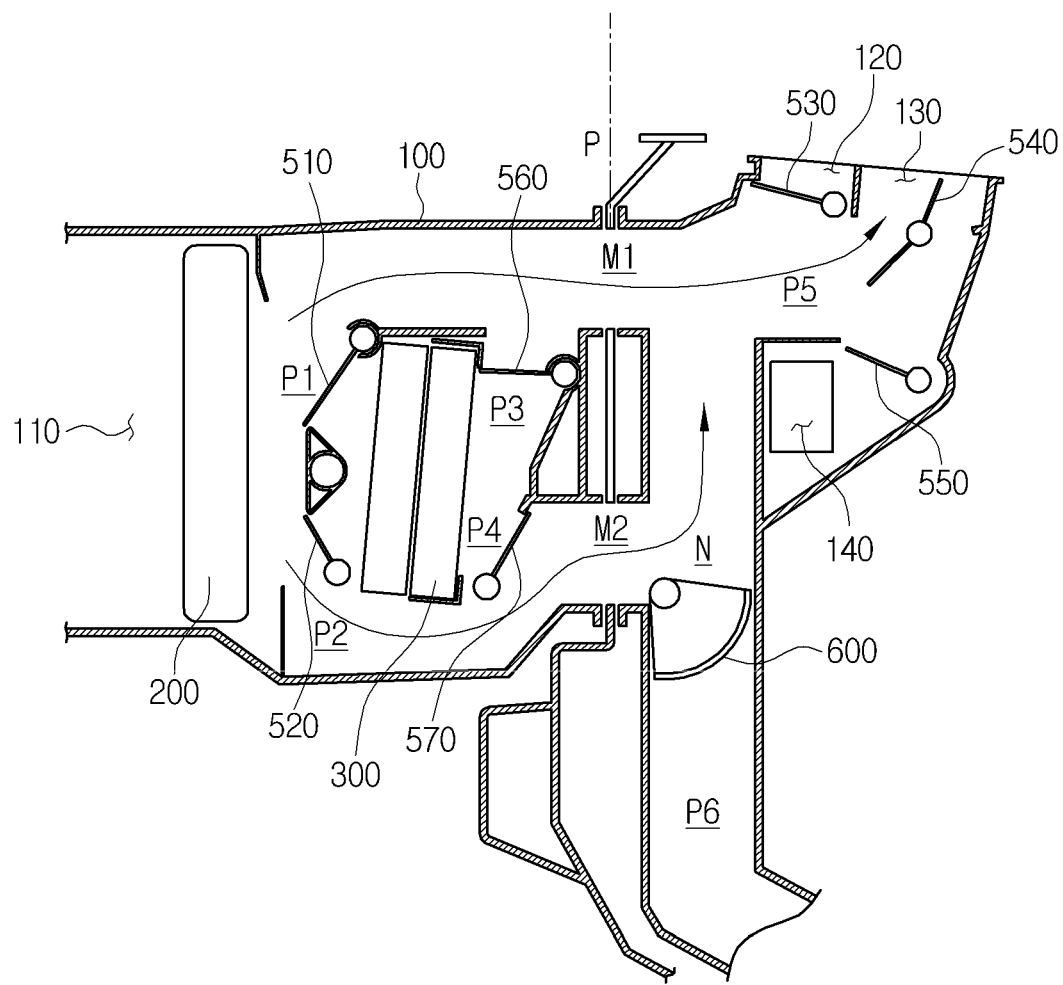
FIG. 5 is a cross-sectional view illustrating a state in which the front seat air passage of the air conditioner for a vehicle according to the present invention is in the ON-state and the rear seat air passage is in an OFF-state.
Figure 6:
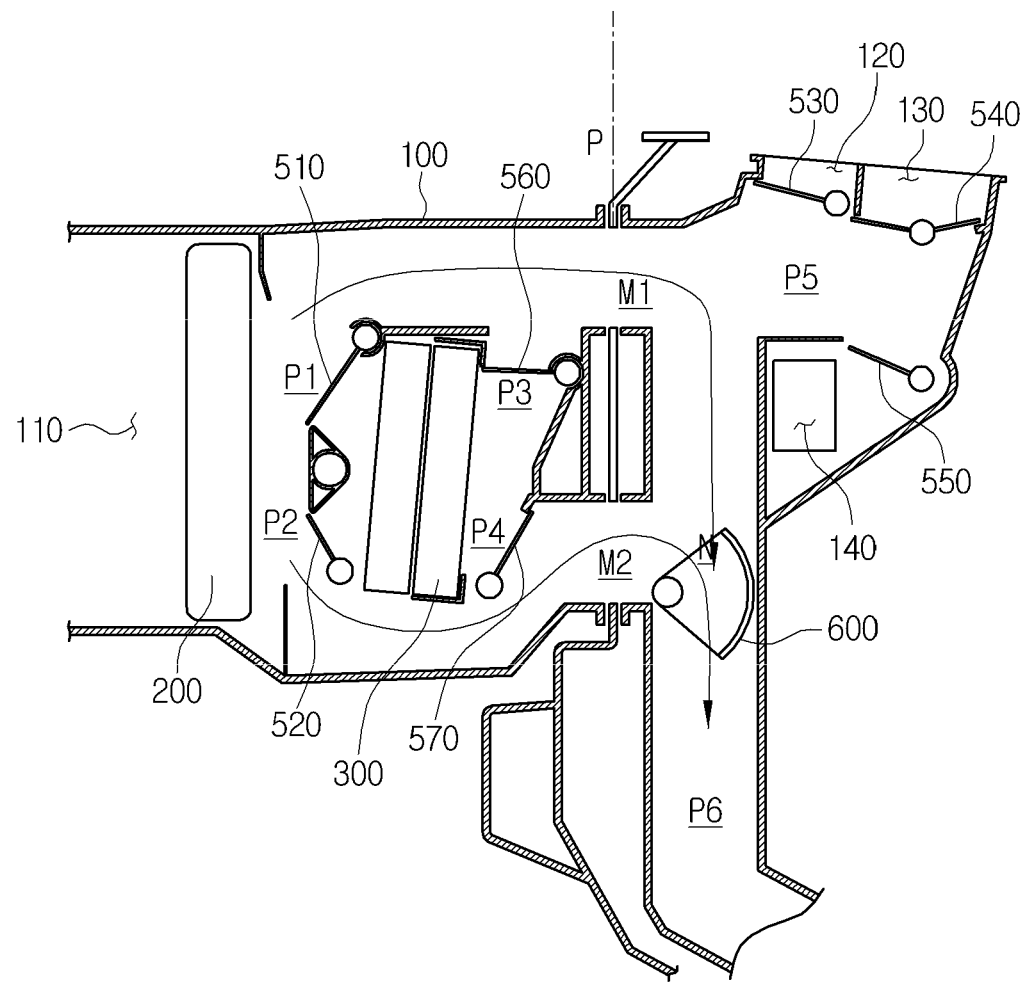
FIG. 6 is a cross-sectional view illustrating a state in which the front seat air passage of the air conditioner for a vehicle according to the present invention is in the OFF-state and the rear seat air passage is in the ON-state.

FIG. 4 is a cross-sectional view illustrating a state in which the front seat air passage and the rear seat air passage of the air conditioner for a vehicle according to an embodiment of the present invention are in an ON-state, FIG. 5 is a cross-sectional view illustrating a state in which the front seat air passage of the air conditioner for a vehicle according to the present invention is in the ON-state and the rear seat air passage is in an OFF-state, FIG. 6 is a cross-sectional view illustrating a state in which the front seat air passage of the air conditioner for a vehicle according to the present invention is in the OFF-state and the rear seat air passage is in the ON-state.

Although an embodiment of the present invention is shown for controlling the flow of cold air for convenience, the present invention is not limited to the embodiment since the flow of hot air is similar to the flow of cold air, and so, it is possible to control the flow of hot air.

1. Front seat air passage and rear seat air passage in ON-state

When the vent door 540 is opened and air is discharged to the front seat face vent 130, which is one of the front seat discharge ports, and when the rear seat mode door is also opened and air is discharged to the rear seat air outlet, the air volume distribution door 600 moves to the upper side of the communication part N where the front seat air passages P1 and P3 and the rear seat air passages P2 and P4 are communicated with each other to close the passage toward the front seat air outlet P5 so that the air of the rear seat air passages P2 and P4 is prevented from rising to the front seat air passages P1 and P3.

Therefore, the cold air and the hot air flowing to the front seat are discharged only to the front seat, and the cold air and the hot air flowing to the rear seat are discharged only to the rear seat. In addition, referring to FIG. 7, the air volume distribution door 600 can adjust the opening degree of a connection part, thereby inducing cold air and hot air, which flow to the rear seat, toward the front seat.

2. Front seat air passage in ON-state and rear seat air passage in OFF-state

When the vent door 540 is opened and air is discharged to the front seat face vent 130, which is one of the front seat discharge ports, and when the rear seat mode door is closed and air is not discharged to the rear seat air outlet, the air volume distribution door 600 moves to the lower side of the communication part N to close the passage of the rear seat outlet P6. On the other hand, since the front seat air passages P1 and P3 and the rear seat air passages P2 and P4 communicate with each other through the communication part N, the hot air and the cool air discharged to the rear seat can be moved along the front seat air outlet P5 to be discharged to the plurality of vents and supplement the air volume of the front seat.

3. Front seat air passage in OFF-state and rear seat air passage in ON-state

When the vent door 540 is closed and air is not discharged to the front seat face vent 130, which is one of the front seat discharge ports, and when the rear seat mode door is also opened and air is discharged to the rear seat air outlet, the air volume distribution door 600 is positioned on the wall of the air conditioning case 100 so as to open the passage of the communication part N, in which the front seat outlet P5 and the rear seat outlet P6 communicate with each other, at a predetermined interval. As a result, the hot air and the cold air discharged to the front seat flow along the rear seat outlet P6, and as a result, the air can be discharged to the plurality of vents, and supplement the air volume of the rear seat.

Figure 7:
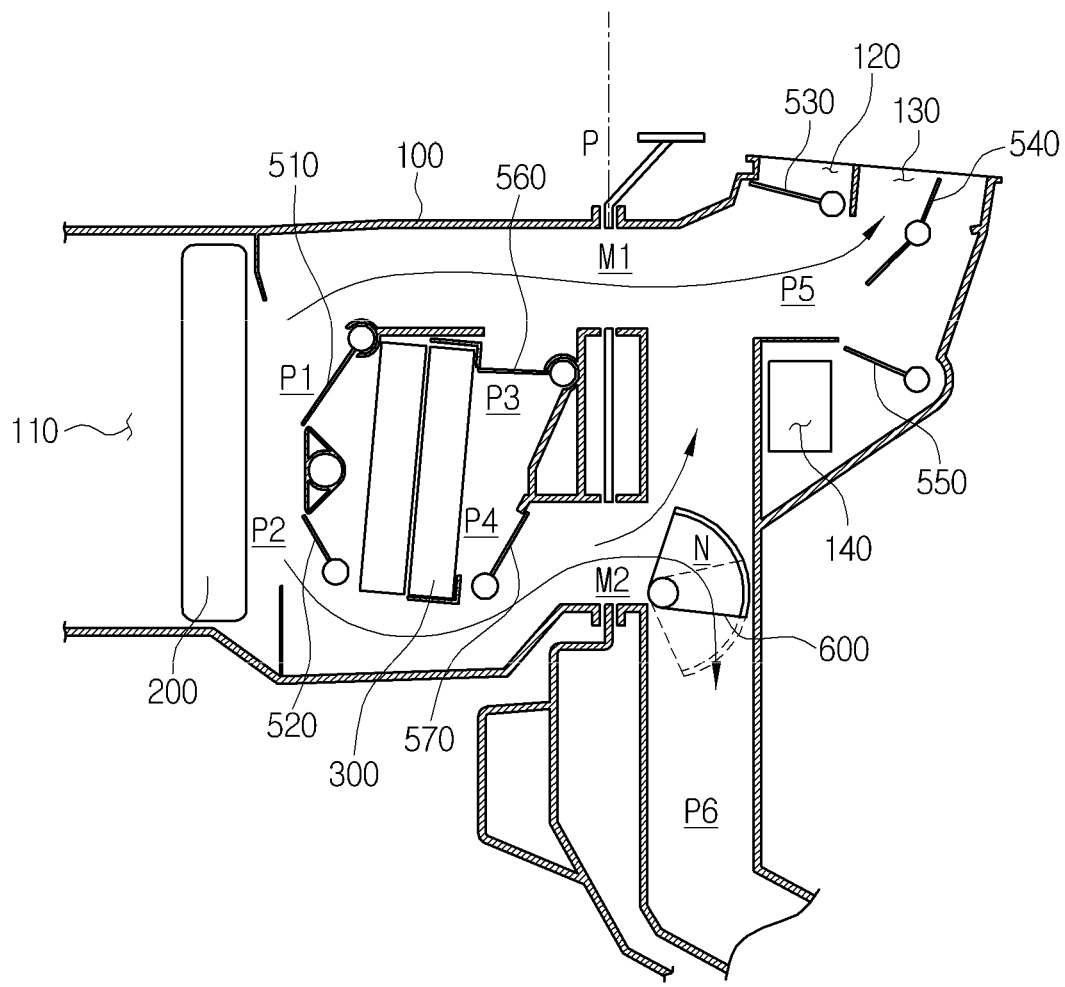
FIG. 7 is a cross-sectional view illustrating a state in which air volume of the front seat air passage and air volume of the rear seat air passage of the air conditioner for a vehicle according to the present invention are controlled.
Figure 8:
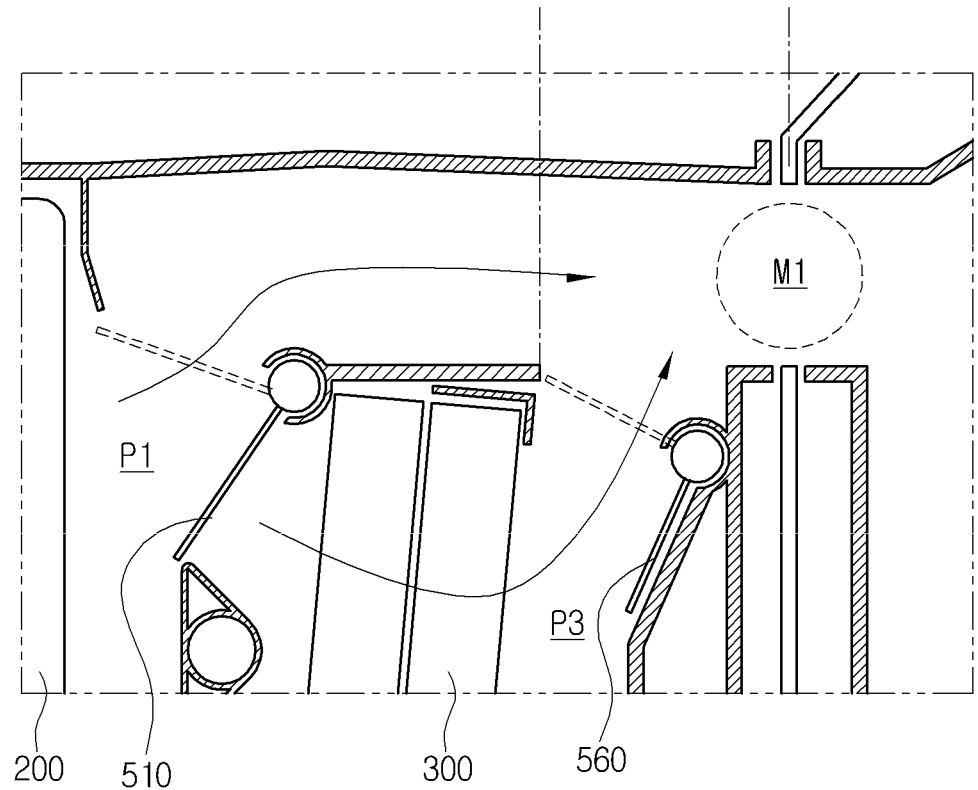
FIG. 8 is an enlarged cross-sectional view illustrating a first mixing part according to an embodiment of the present invention.
Figure 9:
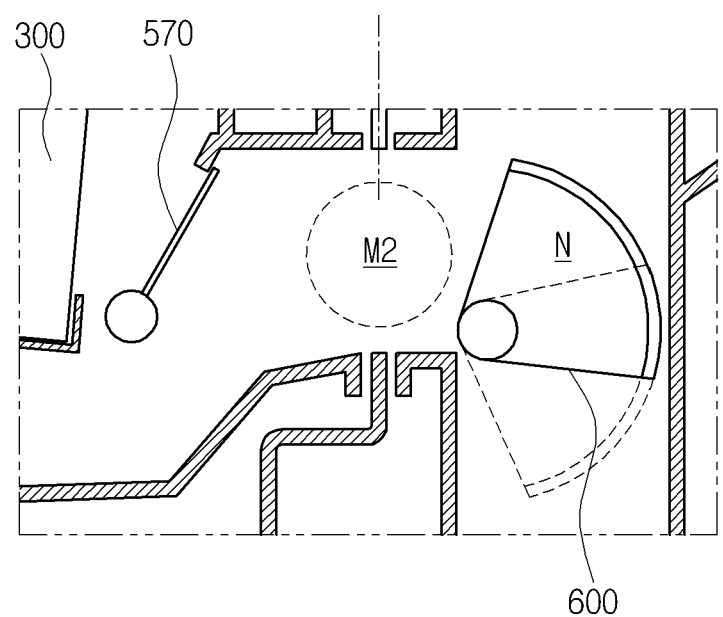
FIG. 9 is a cross-sectional view illustrating a second mixing part according to an embodiment of the present invention.

FIG. 7 is a cross-sectional view illustrating a state in which air volume of the front seat air passage and air volume of the rear seat air passage of the air conditioner for a vehicle according to the present invention are controlled, FIG. 8 is an enlarged cross-sectional view illustrating a first mixing part according to an embodiment of the present invention, and FIG. 9 is a cross-sectional view illustrating a second mixing part according to an embodiment of the present invention.

As illustrated in FIGS. 7 through 9, the air passage in the air conditioning case 110 includes cooling air passages P1 and P2, and heating air passages P3 and P4. The cooling air passages P1 and P2 are passages through which the air passing through the cooling heat exchanger 200 bypasses the heating heat exchanger 300 to flow toward the outlet, and the heating air passages P3 and P4 are passages through which the air passing through the cooling heat exchanger 200 passes through the heating heat exchanger 300 and flows toward the outlet.

The cooling air passages P1 and P2 are divided into a front seat cooling air passage P1 mounted in the upper side of the air conditioning case 110 to discharge air toward the front seat of the vehicle and a rear seat cooling air passage P2 mounted in the lower side of the air conditioning case 110 to discharge air toward the rear seat of the vehicle.

The air conditioner for a vehicle includes a front seat temperature control door 510 and a rear seat temperature control door 520. The front seat temperature control door 510 is disposed at the upper end of the downstream side of the cooling heat exchanger 200 to simultaneously adjust the opening degrees of the front seat cooling air passage P1 and the front seat heating air passage P3. Furthermore, an auxiliary front seat temperature control door 560 is disposed at the upper end of the downstream side of the heating heat exchanger 300 to adjust the opening degree of the front seat heating air passage P3.

As you can see from the description of the conventional air conditioner for a vehicle, the conventional air conditioner requires an additional heating air passage in order to heat the front seat, and so, has a problem in that the size of the air conditioning case 100 is increased in the direction of the heating heat exchanger 300 as hot air is moved through the air passage opened to the upper portion of the heating heat exchanger 300, that is, to the rear surface of the front seat temperature control door 510. In addition, in order to close the passage in a cooling mode, there is a troublesome in that the front seat temperature control door 510 must have shields mounted in both directions around a driving shaft.

However, the auxiliary front seat temperature control door 560 according to an embodiment of the present invention facilitates the flow of hot air discharged toward the front seat, thereby reducing the size of the air conditioning case 100 since not requiring the additional hot air passage of the conventional air conditioner in the heating mode. Therefore, it is obvious that the size of the cold air passage can be increased. Likewise, the front seat temperature control door 510 can have a shield mounted just in one direction around a driving shaft.

Due to the new structure inside the air conditioning case, the air conditioner for a vehicle according to the present invention has a first mixing part M1 formed on the passage P4 passing the auxiliary front seat temperature control door 560 to mix the hot air and the cold air discharged toward the front seat. Since the hot air and the cold air are mixed at an area adjacent to the front seat outlet P5, it is easy to control temperature of air discharged to the front seat.

A rear seat temperature control door 520 is disposed at the lower end of the downstream side of the cooling heat exchanger 200 to simultaneously adjust an opening degree of the rear seat cooling air passage P2 and an opening degree of the rear seat heating air passage P4. Moreover, an auxiliary rear seat temperature control door 570 is disposed at the lower end of the downstream side of the heating heat exchanger 300 to adjust an opening degree of the rear seat heating air passage P4.

The rear seat temperature control door 520 adjusts an opening degree of the passage connected to the rear seat heating air passage P4 and an opening degree of the rear seat cooling air passage P2 formed at the lower side of the air conditioning case 100. In other words, the rear seat temperature control door 520 is disposed at an inlet of the passage connected to the rear seat heating air passage P4 and an inlet of the rear seat cooling air passage P2. In this case, the inlet of the rear seat heating air passage P4 is located between a downstream part of the cooling heat exchanger 200 and an upstream part of the heating heat exchanger 300 in the air flow direction. Furthermore, the inlet of the rear seat cooling air passage P2 corresponds to a downstream part adjacent to the cooling heat exchanger 200 in the air flow direction, and means a boundary portion where the heating air passage and the cooling air passage diverge from each other.

The rear seat temperature control door 520 covers a partial space of the passage connected to the rear seat air passages P2 and P4 to adjust the opening degree of the passage, and covers the entire inlet of the rear seat cooling air passage P2 formed on the lower side to adjust the opening degree of the passage. The rear seat temperature control door 520 closes the passage connected to the rear seat heating air passage P4, and opens the rear seat cooling air passage P2. Additionally, the rear seat temperature control door 520 opens the passage connected to the rear seat heating air passage P4, and closes the rear seat cooling air passage P2 of the lower side.

The air conditioning case 110 further includes an auxiliary rear seat temperature control door 570 disposed therein. The auxiliary rear seat temperature control door 570 adjusts an opening degree of the rear seat heating air passage P4 located downstream of the heating heat exchanger 300 in the air flow direction. That is, when the auxiliary rear seat temperature control door 570 is opened, a second mixing part M2 where the hot air of the rear seat heating air passage P4 and the cold air of the rear seat cooling air passage P2 are mixed is formed downstream of the auxiliary rear seat temperature control door 570.

If the auxiliary rear seat temperature control door 570 closes the rear seat heating air passage P4 downstream of the heating heat exchanger 300 in the air flow direction, the hot air passing through the heating heat exchanger 300 flows into the first mixing part M1 through the auxiliary front seat temperature control door 510. Moreover, in this case, the cold air passing through the rear seat cooling air passage P1 bypasses the heater core 300 and is discharged to the rear seat air outlet.

As you can see referring to FIGS. 3 to 7, the air conditioner for a vehicle according to an embodiment of the present invention includes a dash panel P partitioning an engine room of the interior of the vehicle. In the drawings, the left side is the engine room which corresponds to the exterior of the vehicle, and the left side corresponds to the interior of the vehicle. Accordingly, the plurality of heat exchangers and the plurality of temperature control doors are arranged in the engine room, and the plurality of air discharge vents are arranged in the interior of the vehicle. Therefore, the air conditioner for a vehicle according to the present invention can minimize that noise generated from the heat exchangers is transferred to the interior of the vehicle.

As can be seen from FIGS. 8 through 9, the first mixing part M1 and the second mixing part M2 respectively have bottleneck portions of which the air passages are narrowed. The bottleneck portion is formed at a position where the interior of the vehicle and the engine room are connected to each other after passing through the dash panel P. As described above, due to the bottleneck portion, the air conditioner for a vehicle according to the present invention can perform mixing of air more effectively, and relatively reinforce strength of the dash panel P since a relatively narrower area passes through the dash panel P.

To sum up, in the cooling mode, the air passing through the cooling heat exchanger 200 bypasses the heating heat exchanger 300 and flows to the front seat outlet P5 and the rear seat outlet P6 through the front seat cooling air passage P1 and the rear seat cooling air passage P2. In the heating mode, the air passing through the cooling heat exchanger 200 passes through the heating heat exchanger 300 and flows to the front seat outlet P5 and the rear seat outlet P6 through the front seat heating air passage P3 and the rear seat heating air passage P4.

Therefore, since including the communication part N formed at the point where the front seat air passages P1 and P3 are communicated with the rear seat air passages P2 and P4, and the air volume distribution door 600 disposed around the communication part N, the air conditioner for a vehicle according to the present invention can control the direction and the volume of the flowing air, properly distribute the air, and then, discharge the air to the front seat and the rear seat. As described above, the front seat temperature control door 510 and the rear seat temperature control door 520 can adjust the opening degrees of the cold air passage and the hot air passage at the same time, differently from the conventional air conditioner for a vehicle.

Overall, the air conditioner for a vehicle according to the present invention can stably control temperature and air volume of air discharged to the front seat and the rear seat by manipulation of four temperature control doors. In addition, the air conditioner for a vehicle according to the present invention can minimize the size of a package in arrangement of the heater core and can secure air passages easily since the auxiliary temperature control doors are mounted in the vertical direction.

The invention claimed is:

1. An air conditioner for a vehicle, comprising: an air conditioning case having an air inlet for introducing air, air outlets for discharging the introduced air to the interior of the vehicle, and an air passage formed therein; a cooling heat exchanger and a heating heat exchanger disposed in the air passage of the air conditioning case to exchange heat with the air passing through the heat exchangers, the cooling heat exchanger and the heating heat exchanger being arranged sequentially,
wherein the air passage comprises: a front seat air passage through which cold air or hot air is discharged toward a front seat of a vehicle; and a rear seat air passage through which cold air or hot air is discharged toward the rear seats of the vehicle,
wherein the front seat air passage comprises a front seat cooling air passage and a front seat heating air passage, and
wherein the rear seat air passage comprises a rear seat cooling air passage and a rear seat heating air passage, further comprising:
a first mixing part in which the cold air of the front seat cooling air passage and the hot air of the front seat heating air passage are mixed;
a second mixing part in which the cold air of the rear seat cooling air passage and the hot air of the rear seat heating air passage are mixed;
a front seat temperature control door disposed at the upper end of the downstream side of the cooling heat exchanger to simultaneously adjust an opening degree of the front seat cooling air passage and an opening degree of the front seat heating air passage; and
an auxiliary front seat temperature control door disposed at the upper end of the downstream side of the heating heat exchanger to adjust an opening degree of the front seat heating air passage.

2. The air conditioner according to claim 1, further comprising:
a communication part disposed downstream of the first mixing part and the second mixing part so that the front seat air passage and the rear seat air passage communicate with each other; and
an air volume distribution door disposed at the communication part to control the volume of air discharged to a front seat air outlet and a rear seat air outlet.

3. The air conditioner according to claim 2, wherein the air volume distribution door is a rotary door, and configured to control the air volume of the front seat air passage and the air volume of the rear seat air passage.

4. The air conditioner according to claim 2, wherein the air volume distribution door is positioned to separate and partition the front seat air passage and the rear seat air passage.

5. The air conditioner according to claim 2, wherein the air volume distribution door is positioned to connect the front seat air passage and the rear seat air passage and to close the rear seat outlet.

6. The air conditioner according to claim 2, wherein the air volume distribution door is positioned to connect the front seat air passage and the rear seat air passage and to close the front seat outlet while opening the rear seat outlet.

7. The air conditioner according to claim 1, wherein the front seat temperature control door has a shield formed in one direction around a driving shaft.

8. The air conditioner according to claim 1, wherein the air conditioner for a vehicle includes a dash panel for partitioning an engine room from the interior of the vehicle, the plurality of heat exchangers are arranged in the engine room, and the plurality of air discharge vents are arranged in the interior of the vehicle.

9. The air conditioner according to claim 8, wherein the first mixing part and the second mixing part respectively have bottleneck portions of which the air passages are narrowed, and the bottleneck portions are respectively formed at penetration parts of the dash panel.

10. An air conditioner for a vehicle, comprising: an air conditioning case having an air inlet for introducing air, air outlets for discharging the introduced air to the interior of the vehicle, and an air passage formed therein; a cooling heat exchanger and a heating heat exchanger disposed in the air passage of the air conditioning case to exchange heat with the air passing through the heat exchangers, the cooling heat exchanger and the heating heat exchanger being arranged sequentially,
- wherein the air passage comprises: a front seat air passage through which cold air or hot air is discharged toward a front seat of a vehicle; and a rear seat air passage through which cold air or hot air is discharged toward the rear seats of the vehicle,
- wherein the front seat air passage comprises a front seat cooling air passage and a front seat heating air passage, and
- wherein the rear seat air passage comprises a rear seat cooling air passage and a rear seat heating air passage,
- further comprising:
- a first mixing part in which the cold air of the front seat cooling air passage and the hot air of the front seat heating air passage are mixed;
- a second mixing part in which the cold air of the rear seat cooling air passage and the hot air of the rear seat heating air passage are mixed;
- a rear seat temperature control door disposed at the upper end of the downstream side of the cooling heat exchanger to simultaneously adjust an opening degree of the rear seat cooling air passage and an opening degree of the rear seat heating air passage;
- an auxiliary rear seat temperature control door disposed at the lower end of the downstream side of the heating heat exchanger to adjust an opening degree of the rear seat heating air passage.

* * * * *